(12) United States Patent
Sandberg

(10) Patent No.: US 11,255,394 B2
(45) Date of Patent: Feb. 22, 2022

(54) DISK BRAKE AND BRAKE ACTUATION MECHANISM

(71) Applicant: Haldex Brake Products AB, Landskrona (SE)

(72) Inventor: Stefan Sandberg, Lomma (SE)

(73) Assignee: Haldex Brake Products AB

( * ) Notice: Subject to any disclaimer, the term of this patent is extended or adjusted under 35 U.S.C. 154(b) by 606 days.

(21) Appl. No.: 16/319,549

(22) PCT Filed: Jul. 21, 2017

(86) PCT No.: PCT/EP2017/068557
§ 371 (c)(1),
(2) Date: Aug. 19, 2019

(87) PCT Pub. No.: WO2018/015565
PCT Pub. Date: Jan. 25, 2018

(65) Prior Publication Data
US 2019/0368561 A1 Dec. 5, 2019

(30) Foreign Application Priority Data
Jul. 22, 2016 (DE) .......................... 102016008769.2

(51) Int. Cl.
| | |
|---|---|
| *F16D 65/56* | (2006.01) |
| *F16D 55/22* | (2006.01) |
| *F16D 65/18* | (2006.01) |
| *B60T 1/06* | (2006.01) |
| *F16D 121/14* | (2012.01) |
| *F16D 125/28* | (2012.01) |
| *F16D 127/02* | (2012.01) |

(52) U.S. Cl.
CPC .......... *F16D 65/567* (2013.01); *F16D 55/22* (2013.01); *F16D 65/18* (2013.01); *B60T 1/065* (2013.01); *F16D 2121/14* (2013.01); *F16D 2125/28* (2013.01); *F16D 2127/02* (2013.01)

(58) Field of Classification Search
CPC .......... F16D 55/22; F16D 65/18; F16D 65/46; F16D 65/56; F16D 65/567; F16D 65/568; F16D 65/66; F16D 2121/14; F16D 2125/28
See application file for complete search history.

(56) References Cited

U.S. PATENT DOCUMENTS 3,762,513 A    10/1973    Farr
4,374,551 A *    2/1983    Birkenbach ............ F16D 65/18
                                                                     188/71.9

(Continued)

FOREIGN PATENT DOCUMENTS

DE      2143840 A1    3/1972
DE      3445563 A1    6/1986

(Continued)

*Primary Examiner* — Nicholas J Lane
(74) *Attorney, Agent, or Firm* — St. Onge Steward Johnston and Reens LLC

(57) ABSTRACT

The present invention concerns a brake actuation mechanism for a disc brake, in which a translational movement in the direction of the brake disc leads to a rotation of an input element of an adjustment device, the input element of the adjustment device being designed as part of a ball screw drive. Furthermore, the invention concerns a disc brake with such a brake actuation mechanism.

31 Claims, 20 Drawing Sheets

(56) References Cited

U.S. PATENT DOCUMENTS

| | | | | |
|---|---|---|---|---|
| 4,392,557 | A | * | 7/1983 | Franke .................. F16D 65/567 |
| | | | | 188/71.9 |
| 4,721,190 | A | * | 1/1988 | Schmidt ................ F16D 65/567 |
| | | | | 188/71.9 |
| 2011/0203883 | A1 | * | 8/2011 | Iraschko ................. F16D 65/56 |
| | | | | 188/71.8 |
| 2013/0008749 | A1 | * | 1/2013 | Sandberg ................ F16D 65/18 |
| | | | | 188/71.8 |
| 2016/0017946 | A1 | * | 1/2016 | Sandberg ................ F16D 65/66 |
| | | | | 188/71.8 |
| 2017/0108068 | A1 | * | 4/2017 | Sandberg ................ F16D 65/52 |
| 2017/0122394 | A1 | * | 5/2017 | Sandberg ................ F16D 65/18 |

FOREIGN PATENT DOCUMENTS

| | | |
|---|---|---|
| GB | 2063401 A | 6/1981 |
| WO | 2011113554 A2 | 9/2011 |
| WO | 2013083857 A2 | 6/2013 |
| WO | 2014106672 A1 | 7/2014 |
| WO | 2015140225 A2 | 9/2015 |

\* cited by examiner

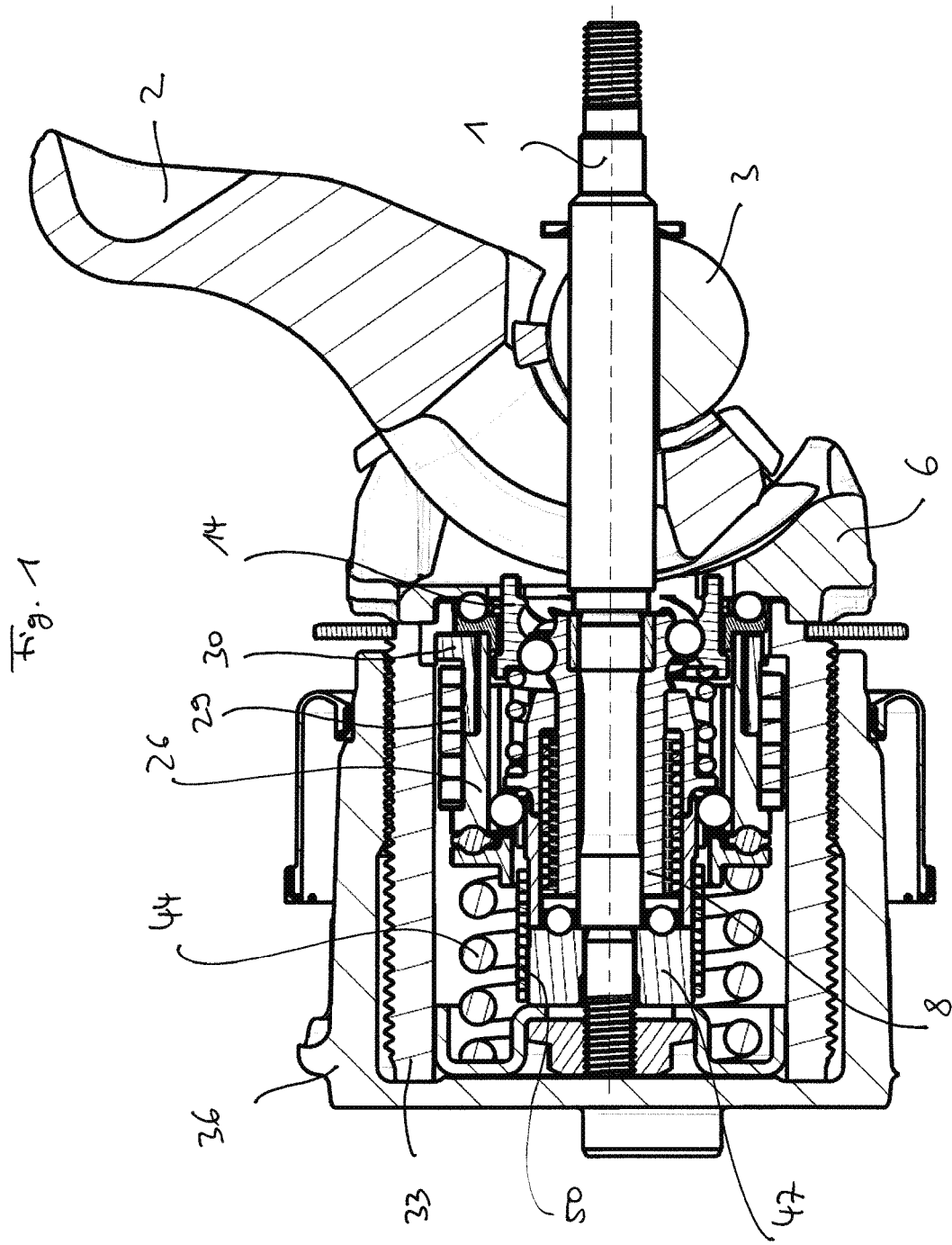

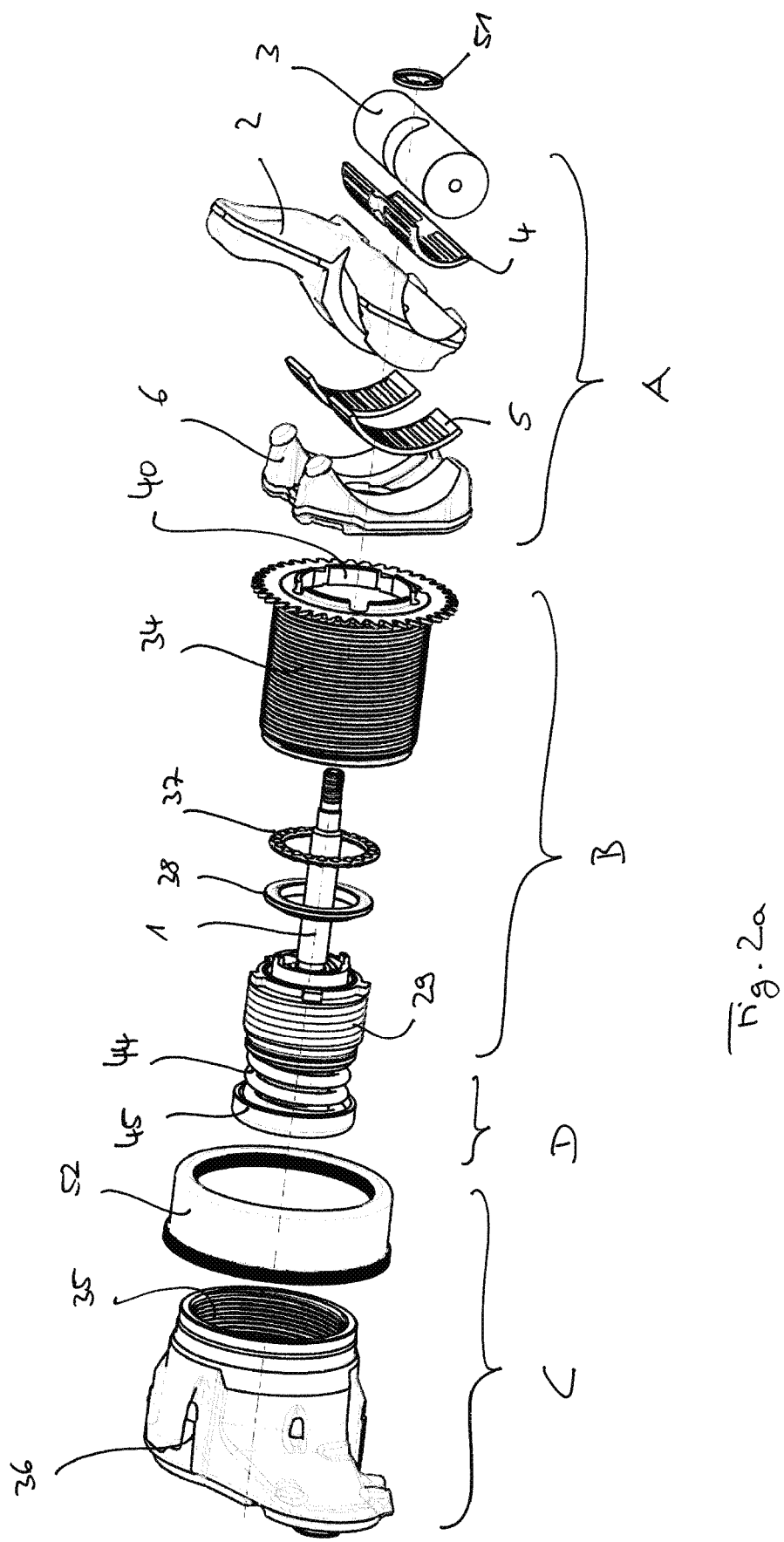

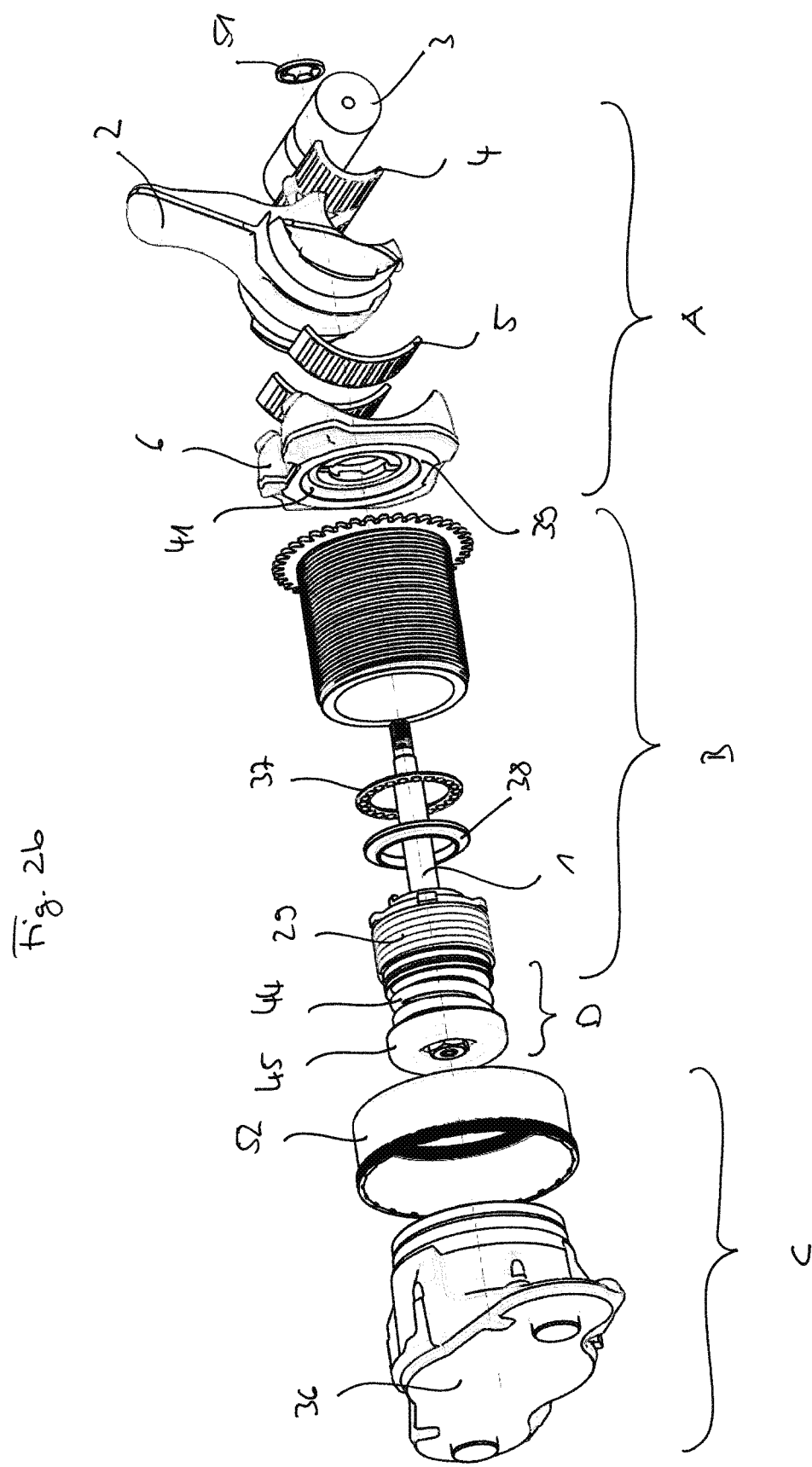

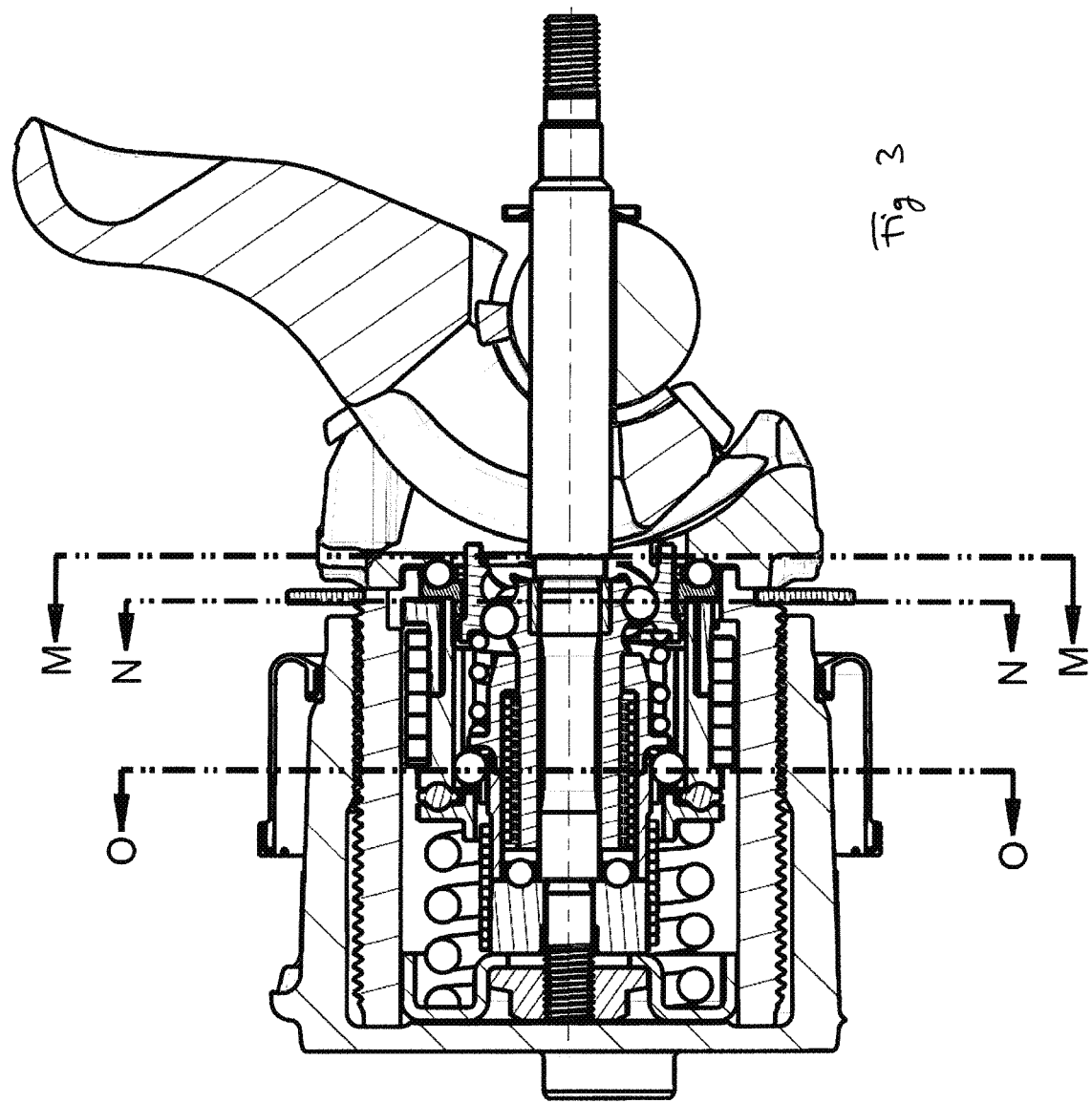

P-P

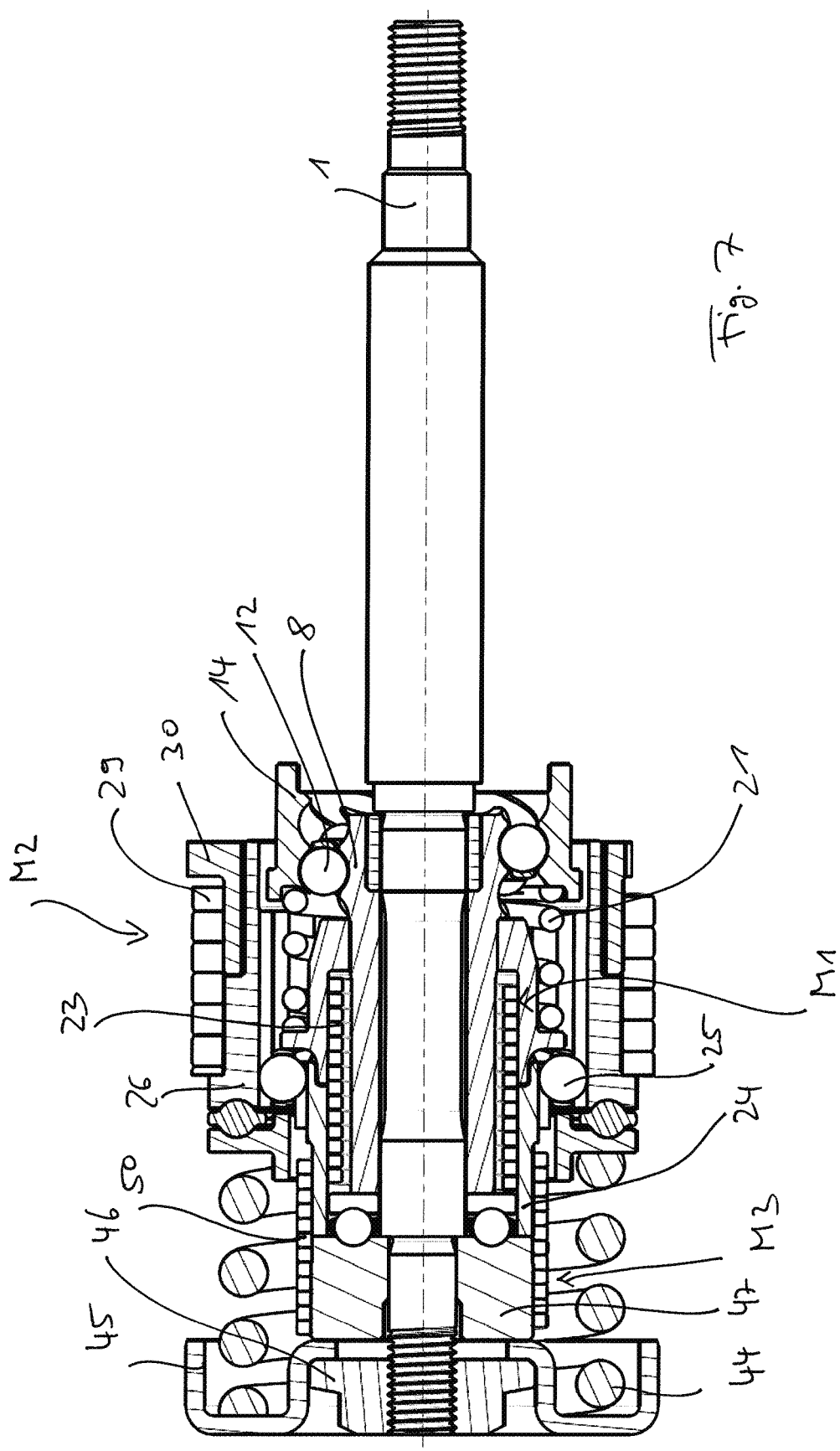

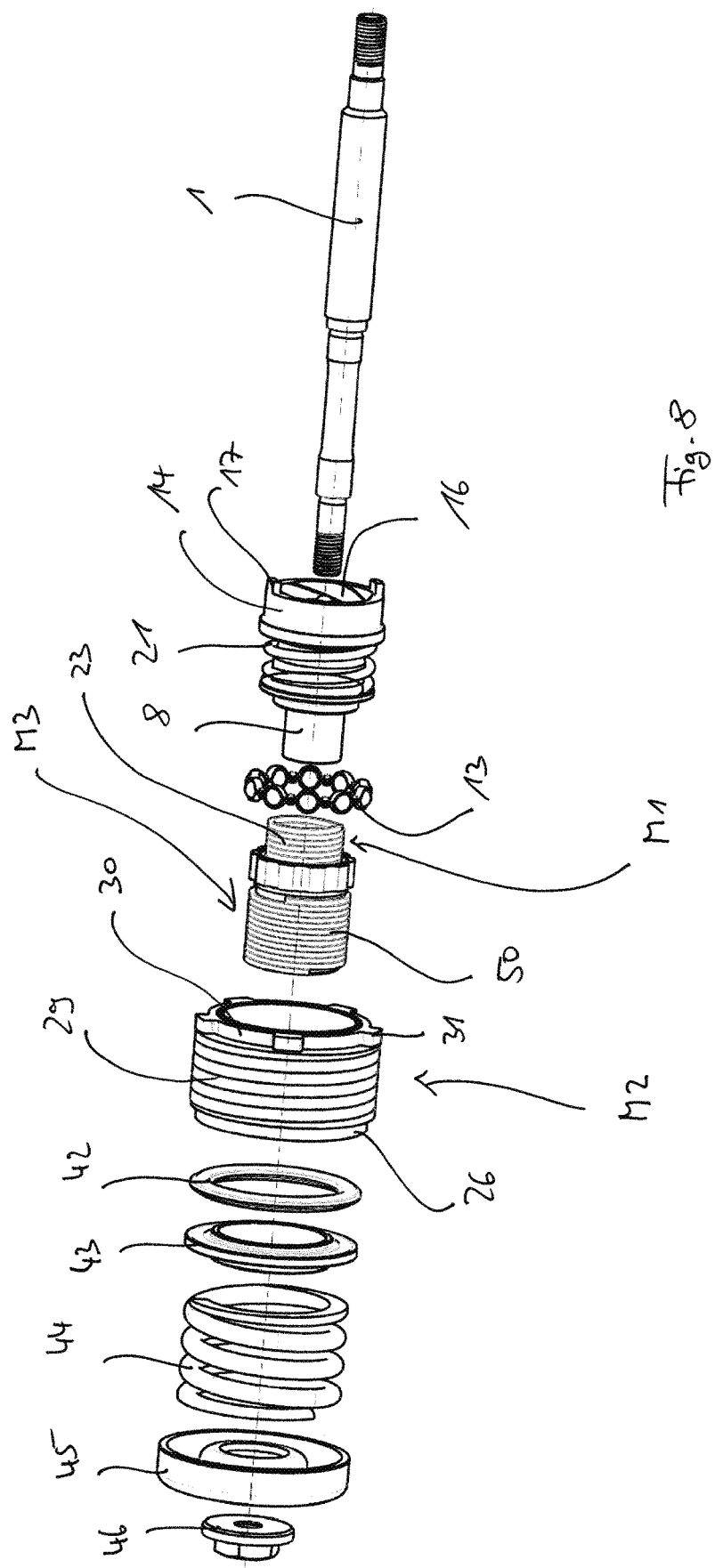

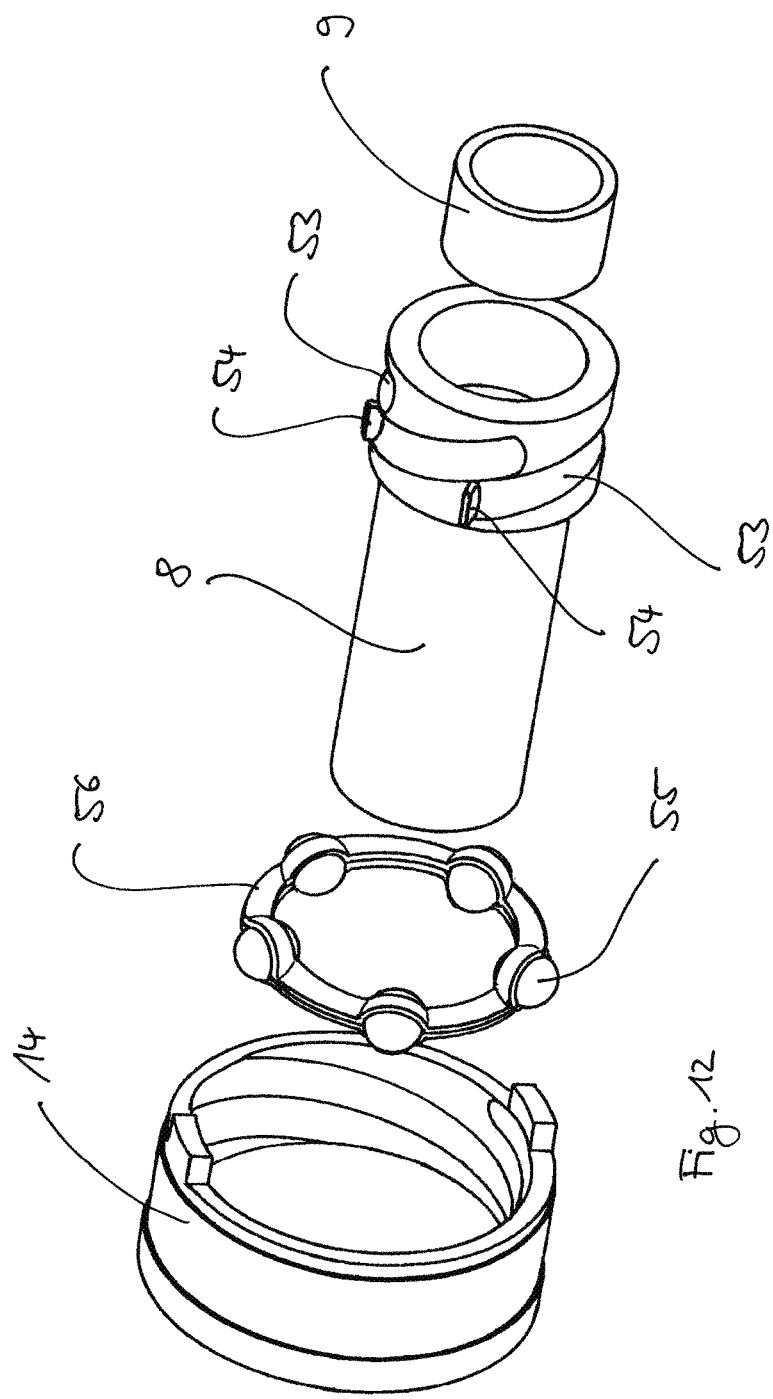

DISK BRAKE AND BRAKE ACTUATION MECHANISM

FIELD OF THE INVENTION

The present invention relates to a brake actuation mechanism for a disc brake and a disc brake, in particular for utility vehicles, incorporating such a brake actuation mechanism.

BACKGROUND OF THE INVENTION

The invention covers disc brakes which have either a sliding caliper or a fixed caliper and which overlap one or more brake discs. The invention relates mainly, but not exclusively, to disc brakes with lining sections of the spot-type.

Disc brakes, in particular for heavy load trucks, are known in a wide variety of designs, both as regards the type of the brake actuation mechanism, the way in which the braking force is transmitted to one or more brake discs and the way in which the brake pads are adjusted to compensate for wear.

A specific embodiment of a brake actuating device used in disc brakes, for example, is known from the applicant's International Application WO 2011/113554 A2. The brake actuation mechanism known from this application is characterized by an extremely compact design, which requires less space in the caliper housing and is lighter. All components of this brake actuation mechanism are mounted together in the caliper in a functionally cooperating manner by means of a rod mounted in the caliper housing in the axial direction so that they act parallel to the axis of rotation of the brake disc. As a result of a displacement movement of the amplification mechanism, a thrust element together with an adjusting device performs a translational movement in the direction of the brake disc in order to transmit the clamping force.

The adjustment device for wear compensation has a torque clutch which is torque-controlled and serves the selective transmission of a rotation dependent on the direction of rotation between components of the torque clutch. In addition, the adjuster comprises a one-way clutch in which two elements rotatably mounted on the rod, an internal sleeve and a hollow shaft are connected to each other by means of a freewheeling spring, the one-way clutch being designed in such a way that it transmits a rotary movement between the two elements during brake actuation and slips when the brake is released.

For the exact function with regard to clamping and transmission of the braking force as well as the adjusting movement of the state-of-the-art brake actuation mechanism, reference is hereby made expressly to the disclosure content of WO 2011/113554 A2. Other similarly designed brake actuation mechanisms are known from, for example, WO 2013/083857 A2, WO 2014/106672 A2 or WO 2015/140225 A2 of the applicant, to which reference is hereby also expressly made.

The above mentioned brake actuation mechanisms of the prior art have in common that a hollow shaft, which is rotatably mounted on the rod, serves as an input element for the adjusting device and is immediately set in rotation by the lever of the amplification mechanism. For this purpose, a pin or similar element is provided at a suitable point on the hollow shaft, the pin projecting radially from the hollow shaft and being received by a recess in the lever, in the region of its pivot bearing surface, with a defined clearance.

This allows the hollow shaft to be set in rotation by a pivoting movement of the lever, which is then introduced into the adjusting device.

However, in the case of frequent brake actuations, such as those that can occur in public transport buses, the connection between pin and recess may be subject to increased wear, which is undesirable for reasons of functional safety and service life.

SUMMARY OF THE INVENTION

The invention therefore has the object of providing a brake actuation mechanism that offers greater functional safety in this respect while maintaining a compact design. Another overriding object is to provide a brake actuation mechanism for a disc brake, particularly for utility vehicles, in which the adjuster is subject to less wear when actuated. In addition, one object is to provide a disc brake using such brake actuation mechanisms.

These objects shall be solved by a brake actuation mechanism as described in claim 1 and by a disc brake having such a brake actuation mechanism as described in claim 30.

In general, irrespective in principle of the concrete configuration of the brake actuation mechanism and the adjustment device implemented therein, the core of the present invention lies in providing a brake actuation mechanism for a disc brake which comprises:

an amplification mechanism for introducing a clamping force for the braking operation, a thrust element for transmitting the clamping force onto a brake disc, the amplification mechanism and the thrust element cooperating such that the thrust element performs a translational movement towards the brake disc by a displacement movement of the amplification mechanism, and an adjustment device to compensate for lining wear, in which an input element of the adjustment device can be set in rotation by this translational movement, and in which the input element of the adjustment device is formed as part of a ball screw drive.

The input element of the adjustment device can be a spindle or a nut of a ball screw drive.

The advantage of using a ball screw drive is that such a mechanism has less friction and thus less wear. The lower drive power required as a result, combined with the possibility of higher movement speeds, is particularly advantageous for adjustment devices, as they allow a more precise adjustment of the position when compensating for the wear-related clearance with a lower expenditure of force.

Since the ball screw drive converts a translational movement into a rotation, according to the invention the forward movement of the thrust element onto the brake disc can be used to cause a rotation in the ball screw drive. The low internal friction of a ball screw drive is an advantage here, since even the application of a linear pressure or thrust force to one of the elements, spindle or nut, which is used as the input element for the adjustment device, causes the other element, nut or spindle, to rotate, depending on which of the elements is located inside the adjustment device in a rotationally fixed manner.

In accordance with the invention, this makes it possible to mechanically decouple the amplification mechanism or the components of the amplification mechanism which act on the adjustment device or on the input element thereof when the brake is applied and, if necessary, when the brake is released. In the absence of a direct mechanical connection via coupling elements, such as pins and recesses in the state of the art, such a brake actuation mechanism is subject to less wear and shows a longer service life.

Moreover, in order to achieve a more compact design of the brake actuation mechanism, the invention allows the input element of the ball screw drive, either the spindle or the nut, to interact directly or indirectly with a torque clutch of the adjustment device.

The invention is directed, but not exclusively, at brake actuation mechanisms in the embodiments known from the state of the art as described above.

Accordingly, the invention in a preferred embodiment relates to a brake actuation mechanism in which the amplification mechanism, the thrust element and the adjustment device can be functionally mounted together in the brake caliper by means of a rod which is mounted in a housing of a brake caliper of the disc brake, immovable in the axial direction and non-rotatable, the input element of the adjustment device being designed as a hollow spindle of a ball screw drive rotatably mounted on the rod.

The hollow spindle can be rotatably mounted on the rod via at least one bearing element, e.g. a plain (slide) bearing ring.

A nut of the ball screw drive is provided radially surrounding the hollow spindle at least over a section of it with interposition of balls or rows of balls. The nut is preferably arranged in the area of the adjustment device facing away from the brake disc in such a way that it can be subjected to axial pressure, either directly or indirectly, by the amplification mechanism. In this way, the translational movement induced by the amplification mechanism in the thrust element and ultimately also in the adjustment device is converted into a rotational movement of the hollow spindle which, as will be explained below, serves to adjust a clearance caused by wear.

The amplification may have a lever mounted pivotally in a bearing seat body. The nut of the ball screw drive is non-rotatably connected to the bearing seat body and can therefore perform only one translational movement together with the bearing seat body. The non-rotating connection can, for example, be realized advantageously by the fact that the nut has projections on the end face which engage in correspondingly complementary recesses in the bearing seat body, forming a pin-groove connection.

The principle according to the invention with regard to this embodiment is that the ball screw drive is integrated within the adjustment device, which is essentially rotationally symmetrical around the rod. Whereas in the state of the art brake actuation mechanisms described above, the hollow spindle is connected to the lever by a mechanical connection by means of a pin of the hollow spindle, which engages in a recess in the lever body with a defined clearance, in the preferred embodiment of the brake actuation mechanism described here, according to the invention, there is no direct force-transmitting contact between the hollow spindle and the lever.

By using a ball screw drive, in which the hollow spindle of the adjustment device forms the output element of the ball screw drive, the pure translational movement, directed forwards towards the brake disc, of the bearing seat body and of the nut, which is connected thereto in a non-rotating manner and forms the drive element of the ball screw drive, is therefore sufficient to set the hollow spindle in a rotational movement and thus to activate the adjustment device, the translational movement resulting from the pivoting or displacement movement of the lever and the substantially linear guidance of the thrust element in a housing of a brake caliper of the disc brake.

In one embodiment, the hollow spindle of the ball screw drive has a threaded section which is in a rotatable connection with the nut of the ball screw drive via balls, and a cylindrical section. The cylindrical section, in turn, is supported at its end by an abutment ring under a rotary support to absorb the axial forces transmitted through the hollow spindle. The pivot bearing used for this purpose can be designed with low friction.

In addition, the cylindrical section is connected to a coupling sleeve radially surrounding this cylindrical section by a rotationally fixed connection. This rotationally fixed connection can preferably be realized by means of an appropriately selected interference fit, so that the hollow spindle and the coupling sleeve rotate together.

A spring is located between the nut of the ball screw drive and the coupling sleeve and extends over a defined axial distance to hold the nut in secure engagement with the bearing seat body.

The coupling sleeve itself is coupled to a radial bearing hub via a first freewheeling (or sprag spring) forming a first torque clutch. The radial bearing hub connects axially to the coupling sleeve, whereby both components enclose the first freewheeling spring radially on the inside and the first freewheeling spring maintains a radial distance to the cylindrical section of the hollow spindle.

The radial bearing hub is connected via a radial ball bearing with a front torque sleeve in relation to the brake disc in a rotationally fixed but axially displaceable connection. The front torque sleeve is designed in such a way that it surrounds the coupling sleeve and partly the nut as well as the spring arranged between them while maintaining a certain radial distance.

The front torque sleeve is coupled to a rear torque sleeve via a second freewheeling spring to form a second torque clutch, the second freewheeling spring enclosing the front torque sleeve and the rear torque sleeve radially on the outside.

The rear torque sleeve, in turn, is in a torque-proof (rotationally fixed) connection with an adjustment spindle of the adjustment device radially surrounding the torque sleeve, which is in threaded engagement with a sleeve-like or pot-like thrust piece of the thrust element mounted in a torque-proof manner in the housing of the brake caliper.

The rear torque sleeve is rotatably mounted on the bearing seat body via a preferably low-friction bearing element. In addition, since the adjustment spindle is in direct contact with the bearing seat body at its end facing away from the brake disc, during brake actuation the main force flow of the clamping force introduced by the lever runs directly from the bearing seat body of the lever over the adjustment spindle and via the threaded engagement in the thrust piece and thus over a brake lining connected to the latter onto the brake disc. The adjustment device is thus essentially decoupled from the clamping force.

The radial bearing hub is coupled with the abutment ring arranged on the rod towards the brake disc via a third freewheeling spring to form a third torque clutch, the third freewheeling spring enclosing the radial bearing hub and the abutment ring radially on the outside.

A return spring of a resetting device engages on the front torque sleeve, a retaining ring being provided between the return spring and the front torque sleeve, and the front torque sleeve being rotatably mounted on the retaining ring via a plain bearing ring. On the side opposite the retaining ring, the return spring is supported on an abutment shell, the return spring extending over a defined axial distance between the abutment shell and the retaining ring. The abutment shell is clamped between the abutment ring and a fastening nut which can be fastened to the end of the rod on the brake disc side, whereby the abutment shell seals the adjustment spindle on the brake disc side to the front and thus protects the adjustment device completely accommodated inside the adjustment spindle as well as the resetting device formed by the return spring.

The axial dimensions of the amplification mechanism, the adjustment device, the thrust element and the resetting device in relation to their arrangement on the rod and in relation to the installation position defined by the rod in the brake caliper can be designed in such a way that the return spring exerts a defined spring force on the second torque clutch while providing a defined torque limitation.

In order to achieve a very compact design, the invention provides that the first freewheeling spring of the first torque clutch and the second freewheeling spring of the second torque clutch as well as the first freewheeling spring of the first torque clutch and the third freewheeling spring of the third torque clutch overlap in sections in the axial direction.

A further advantage of the brake actuation mechanism according to the invention is that the ball screw drive of the adjustment device can be configured and adjusted individually with regard to the desired adjustment behaviour, taking into account the further design of the adjustment device and the brake actuation mechanism, whereby, with regard to the design, a targeted influence is exerted to the type of thread to be used, such as the type of grooves and balls, the shape of threads, etc.

Thus, according to the invention, between the nut and the threaded section of the ball screw drive, balls or ball cages may be arranged in one or more rows.

It is also possible to vary the number, inclination angle and/or circumferential extension of the grooves of the nut and/or the grooves of the threaded section. The grooves of the nut and/or the grooves of the threaded section may have a varying pitch.

In addition, it may be provided that several grooves are arranged which extend only over a partial circumference and overlap partially. The grooves themselves may have stops at their ends which limit the orbital movement of the balls.

In a preferred embodiment of the brake actuation mechanism according to the invention, it is provided that the grooves of the nut and the grooves of the threaded section are designed in such a way that a first adjustment is effected at low speeds of rotation of the hollow spindle and a further adjustment beyond that is effected at higher speeds of rotation of the hollow spindle by the adjustment device.

The invention also concerns a disc brake which has a brake actuation mechanism in at least one of the embodiments as described above. In particular, the invention concerns a disc brake in which a brake actuation mechanism according to at least one of the designs described above can be mounted by a rod in a housing of a brake caliper of the disc brake at least in modules or as a whole as a self-supporting unit.

BRIEF DESCRIPTION OF THE DRAWINGS

Further advantages and features of the invention result from the following description of the embodiments shown in the drawings, in which:

FIG. 1 is a longitudinal section in axial direction of a brake actuation mechanism according to the invention;

FIG. 2a is an exploded view of the brake actuation mechanism in a first view;

FIG. 2b is an exploded view of the brake actuation mechanism in a further view;

FIG. 7 is a longitudinal section in axial direction through an adjustment device and resetting device according to the invention;

FIG. 8 is an exploded view of the adjustment device and resetting device from FIG. 7;

FIG. 9b is an exploded view of the ball screw drive from FIG. 9a;

FIG. 10b is an exploded view of this part from FIG. 10a,

FIG. 12 is an alternative embodiment of the ball screw thread structure according to the invention.

DETAILED DESCRIPTION OF THE INVENTION

Figure 4:
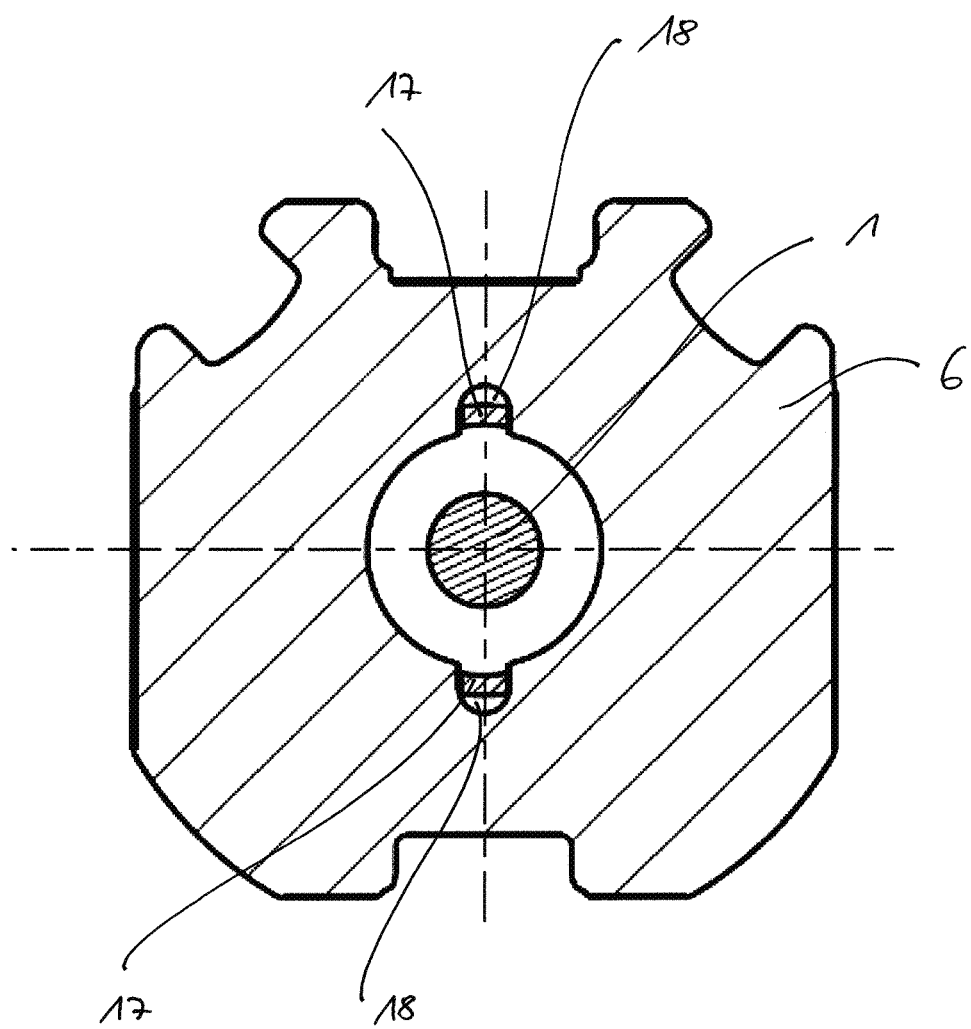
FIG. 4a is a cross-section along M-M from FIG. 3.
FIG. 4b is a cross-section along N-N from FIG. 3.
FIG. 4c is a cross-section along O-O from FIG. 3.

FIGS. 1 through 6 generally show all the components of a brake actuation mechanism according to the invention. For the exact installation position of such a brake actuation mechanism in accordance with the invention in a housing of a brake caliper, reference shall be made, for example, to WO 2011/113554 A2 of the applicant, the disclosure content of which is incorporated by reference herein.

The brake actuation mechanism according to the invention consists essentially of four modules which functionally cooperate, namely an amplification mechanism A, an adjustment device B, a thrust element C and a resetting device D, the brake actuation mechanism itself being mountable as a self-supporting unit by means of a centrally arranged rod 1 on it and thereby in a housing of the brake caliper.

The amplification mechanism A serves to introduce an actuating force from a hydraulic, pneumatic or electro-mechanical actuator (not shown here) into the brake actuation mechanism as a clamping force and to enforce it in accordance with a transmission ratio determined by its design. A lever 2 is pivotably mounted in a rear housing portion of a brake caliper (also not shown here) by being rotatably arranged relative to a roller 3, the roller 3 being eccentrically positioned relative to the axis of rotation of the lever 2. Needle bearings or needle bearing cages 4 are provided between the roller 3 and the corresponding surface of the lever 2.

On the side opposite the roller 3, the lever 2 is pivoted via corresponding needle roller bearings or needle roller bearing cages 5 in corresponding bearing surfaces of a one-piece bearing seat body 6.

The amplification mechanism A is designed in such a way that, by a rotation about the roller 3, the lever 2 carries out an eccentric displacement movement in relation to the latter, which leads to a corresponding increase in the actuating force acting on the lever 2, which is then transmitted to the adjustment device B and the thrust element C as a clamping force via a translational movement of the bearing seat body 6, which can be linearly guided in the housing of the brake caliper for this purpose.

The adjustment device B follows in the axial direction in relation to a brake disc (not shown here) directly after the bearing seat body 6 and has a ball screw drive 7, as shown best in FIGS. 7 to 9b.

The ball screw drive 7 comprises a hollow spindle 8, which is rotatably mounted on the rod 1 inter alia via a plain or slide bearing bush 9.

The hollow spindle 8 is divided into a threaded section 10 facing away from the brake disc and towards the bearing seat body 6 and a cylindrical section 11 facing towards the brake disc.

The threaded section 10 is connected to a nut 14 radially surrounding the threaded section 10 via balls 12 which are mounted in a double-row ball cage 13, as shown in FIG. 9b.

The threaded section 10 has corresponding grooves 15 and the nut 14 has corresponding grooves 16, between which the balls 12, arranged in two rows, are guided.

The nut 14 forms the drive element of the ball screw drive 7 and is non-rotatably connected to the bearing seat body 6 by the fact that projections 17 provided at the end face of the nut 14 and extending in the axial direction engage in corresponding recesses 18 of the bearing seat body 6, as shown best in the sectional drawing of FIG. 4a.

Due to the kinematics of the ball screw drive 7, this causes a translational movement of the bearing seat body 6 and thus of the nut 14 to result in a rotary movement of the hollow spindle 8 on the rod 1 when the clamping force is applied.

According to the invention, the hollow spindle 8, as the output element of the ball screw drive 7, also forms the input element for the adjustment device B, as will be explained below.

A coupling sleeve 19 is arranged on the hollow spindle 8 in the area of the cylindrical section 11, which is connected to the hollow spindle 8 in a rotationally fixed manner via a press fit.

Figure 9A:
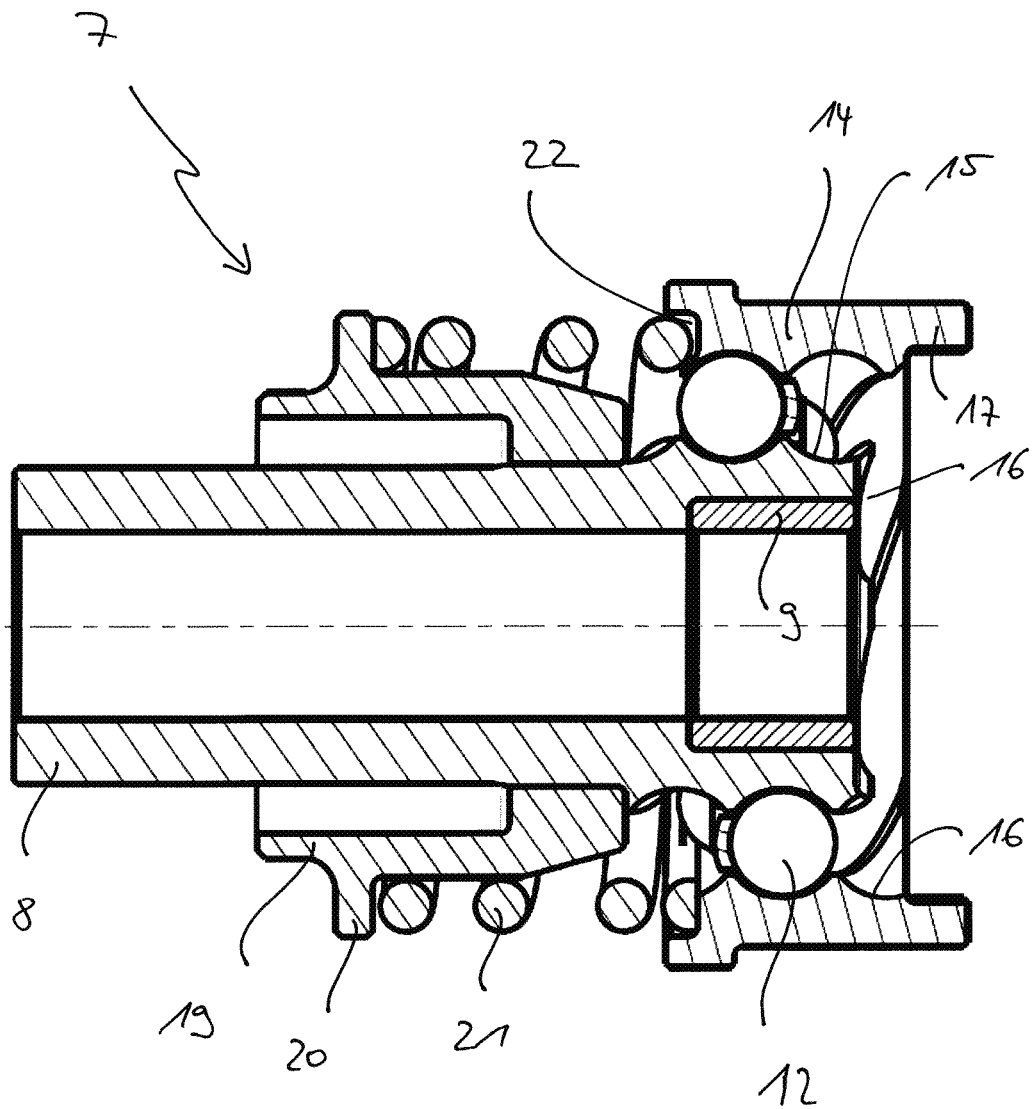
FIG. 9a is a longitudinal section in axial direction through a ball screw drive of the adjustment device according to the invention.
Figure 3B:
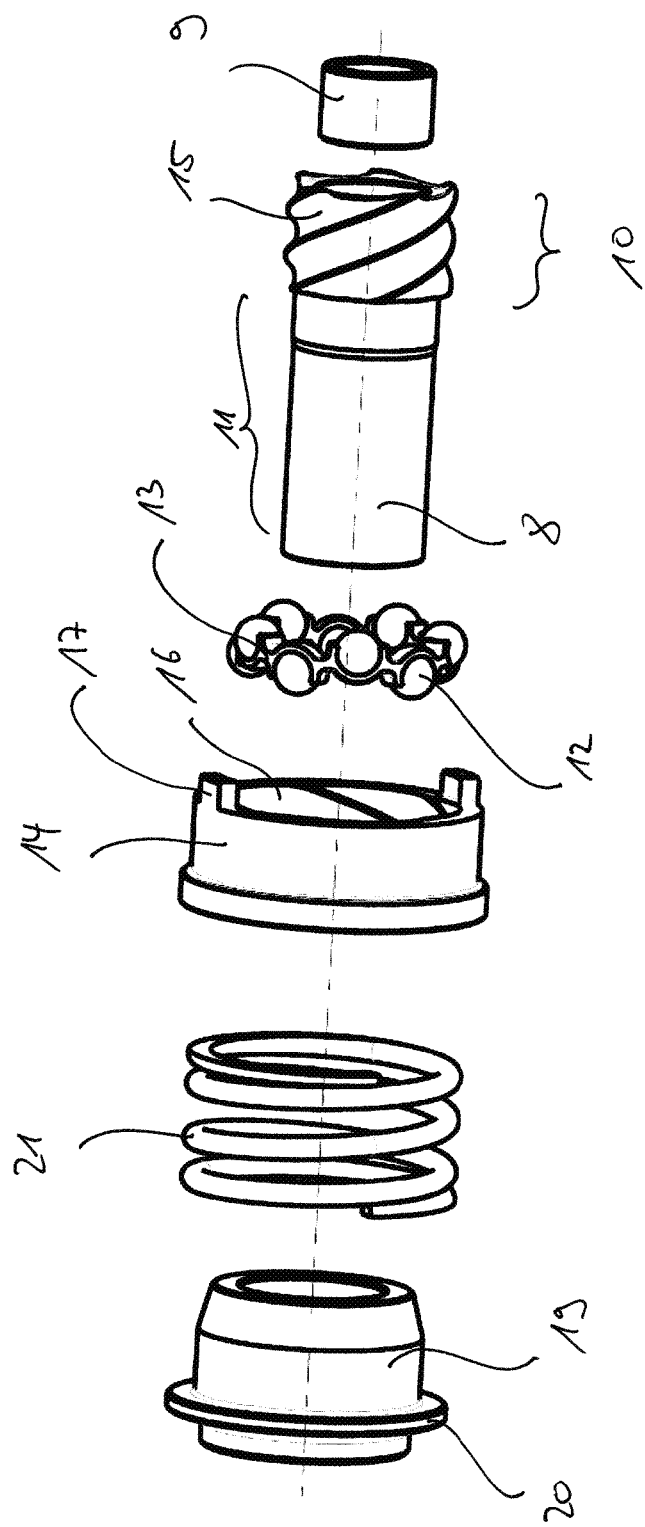
FIG. 3 is is the longitudinal section from FIG. 1 with details of sections.
Figure 10A:
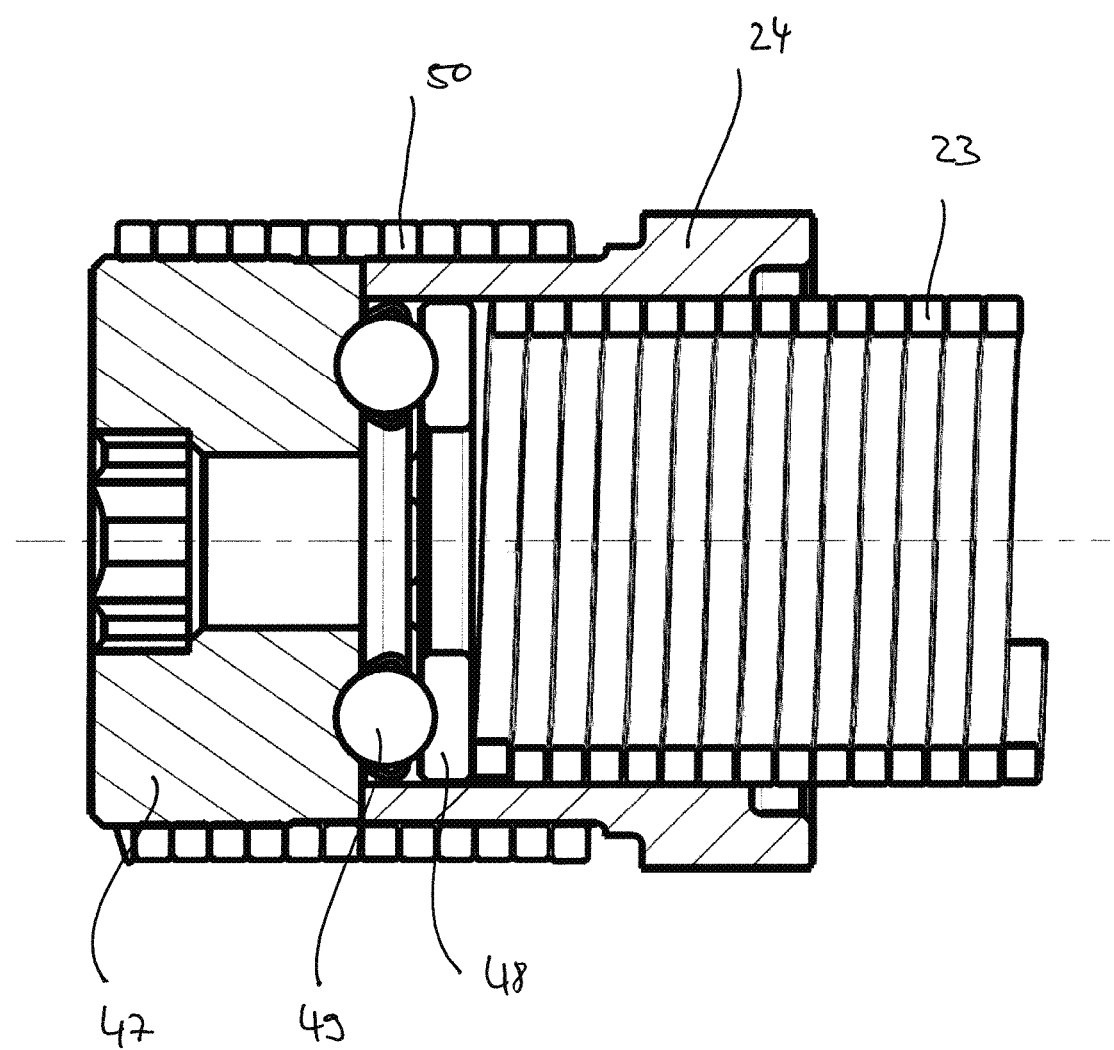
FIG. 10a is a longitudinal section in axial direction through a front part of the adjustment device facing the brake disc according to the invention.
Figure 10B:
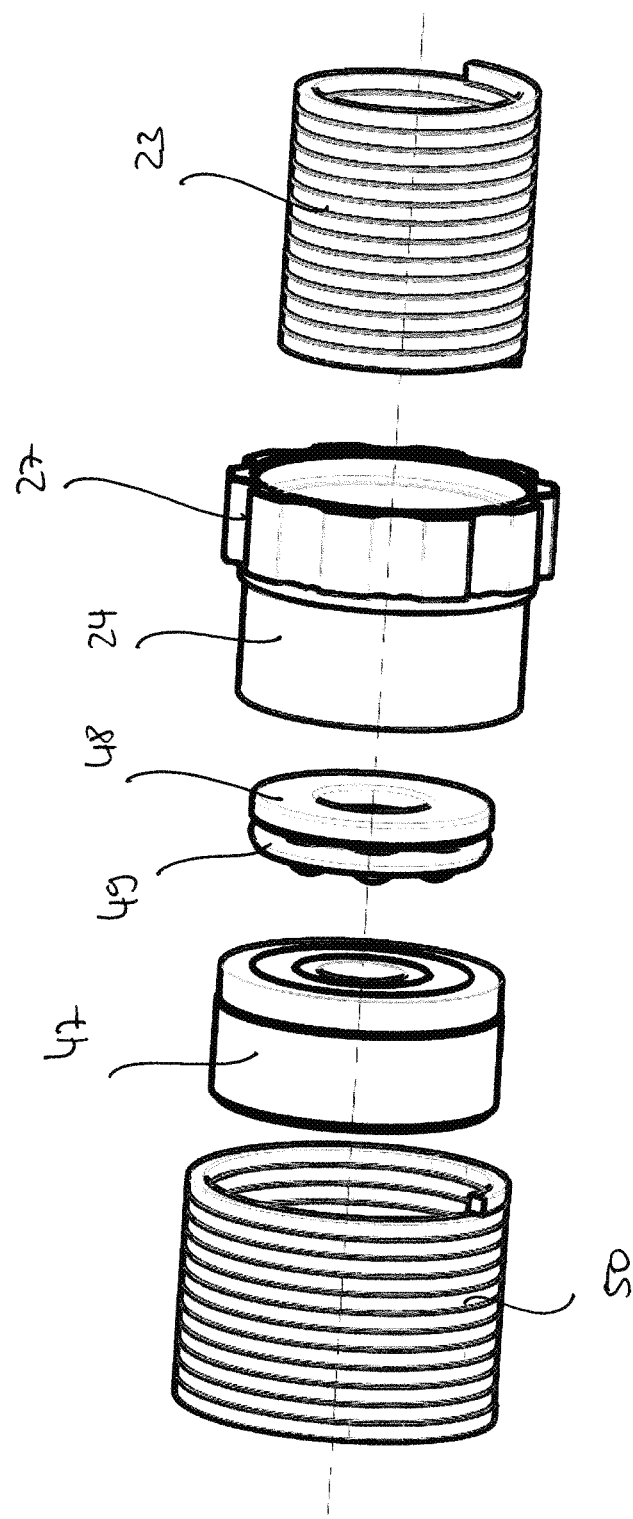

The coupling sleeve 19 comprises a circumferential flange ring 20 on which a spring 21 is supported, which is accommodated on the opposite side in an end recess 22 of the nut 14, so that the spring cannot migrate radially, as shown in FIG. 9a.

The spring 21 is able to hold the pins 17 in engagement with the recesses 18.

The coupling sleeve 19 is coupled to a radial bearing hub 24 via a first freewheeling spring 23. The coupling sleeve 19 and the radial bearing hub 24 radially enclose the first freewheeling spring and thus form a first torque clutch M1.

Figure 11A:
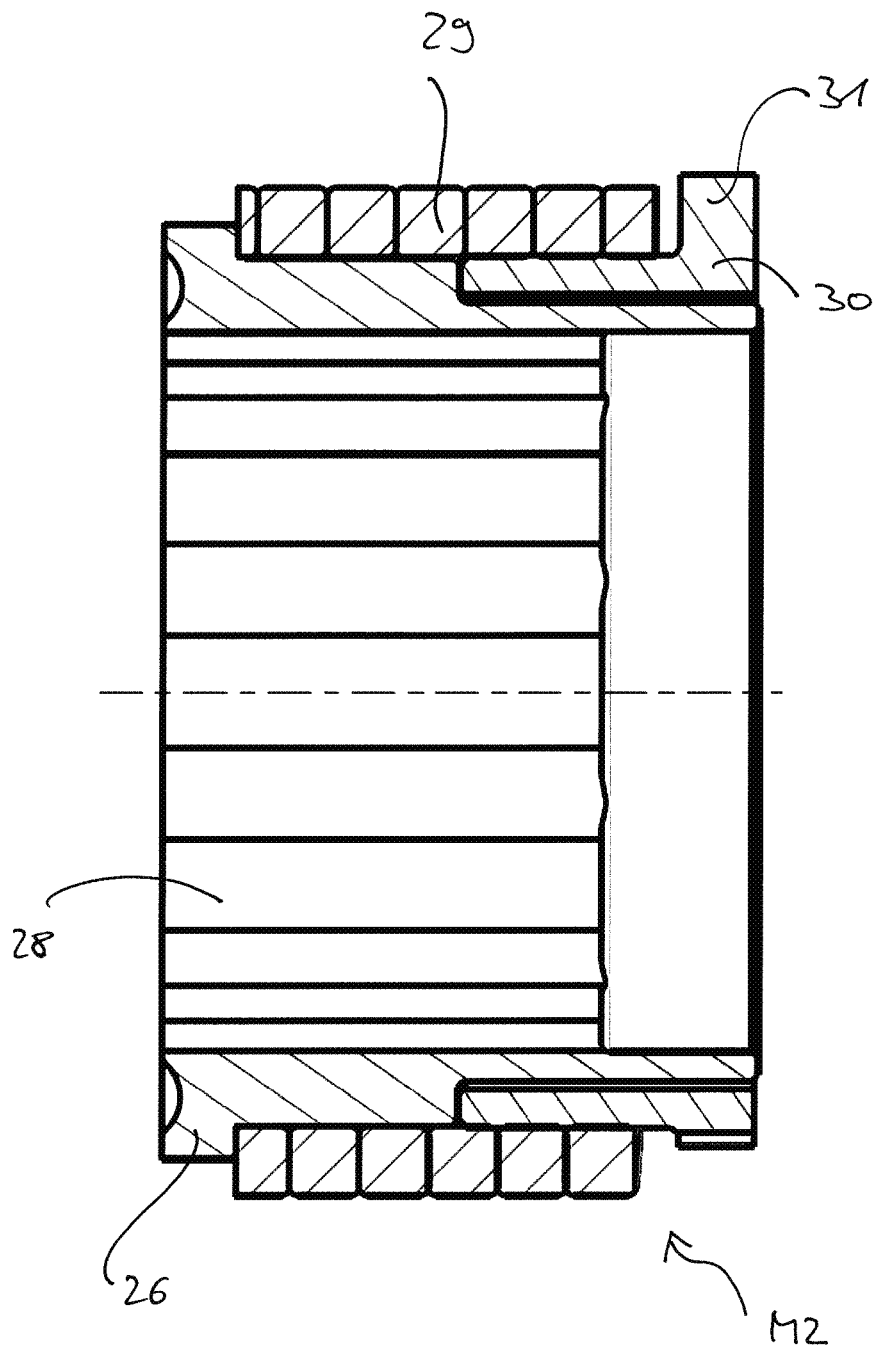
FIG. 11a is a longitudinal section in axial direction through a further part of the adjustment device according to the invention.
Figure 11B:
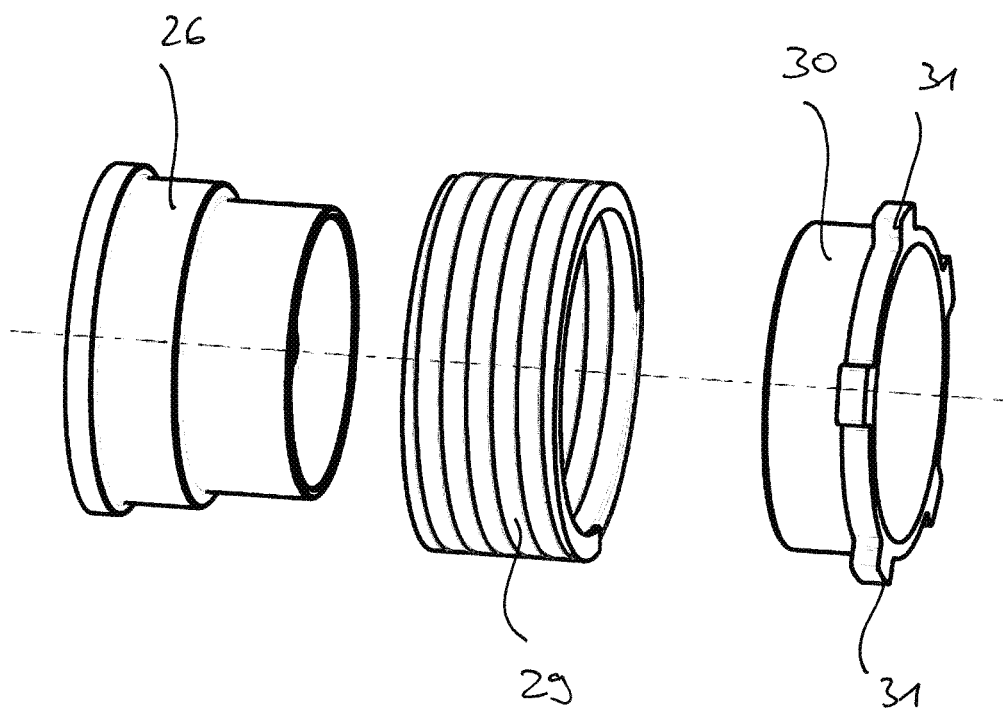
FIG. 11b is an exploded view of this part from FIG. 11b.

The radial bearing hub 24 is connected via a radial bearing 25 with a front torque sleeve 26 in a torque-transmitting connection. The radial bearing hub 24 comprises longitudinal grooves 27 and the front torque sleeve 26 has corresponding longitudinal grooves 28 (see FIG. 11a), between which the balls of the radial bearing 25 are mounted, so that torque transmission is provided with simultaneous axial displaceability between these elements.

By forming a second torque clutch M2, the front torque sleeve 26 is connected to a rear torque sleeve 30 via a second freewheeling spring 29.

Figure 4B:
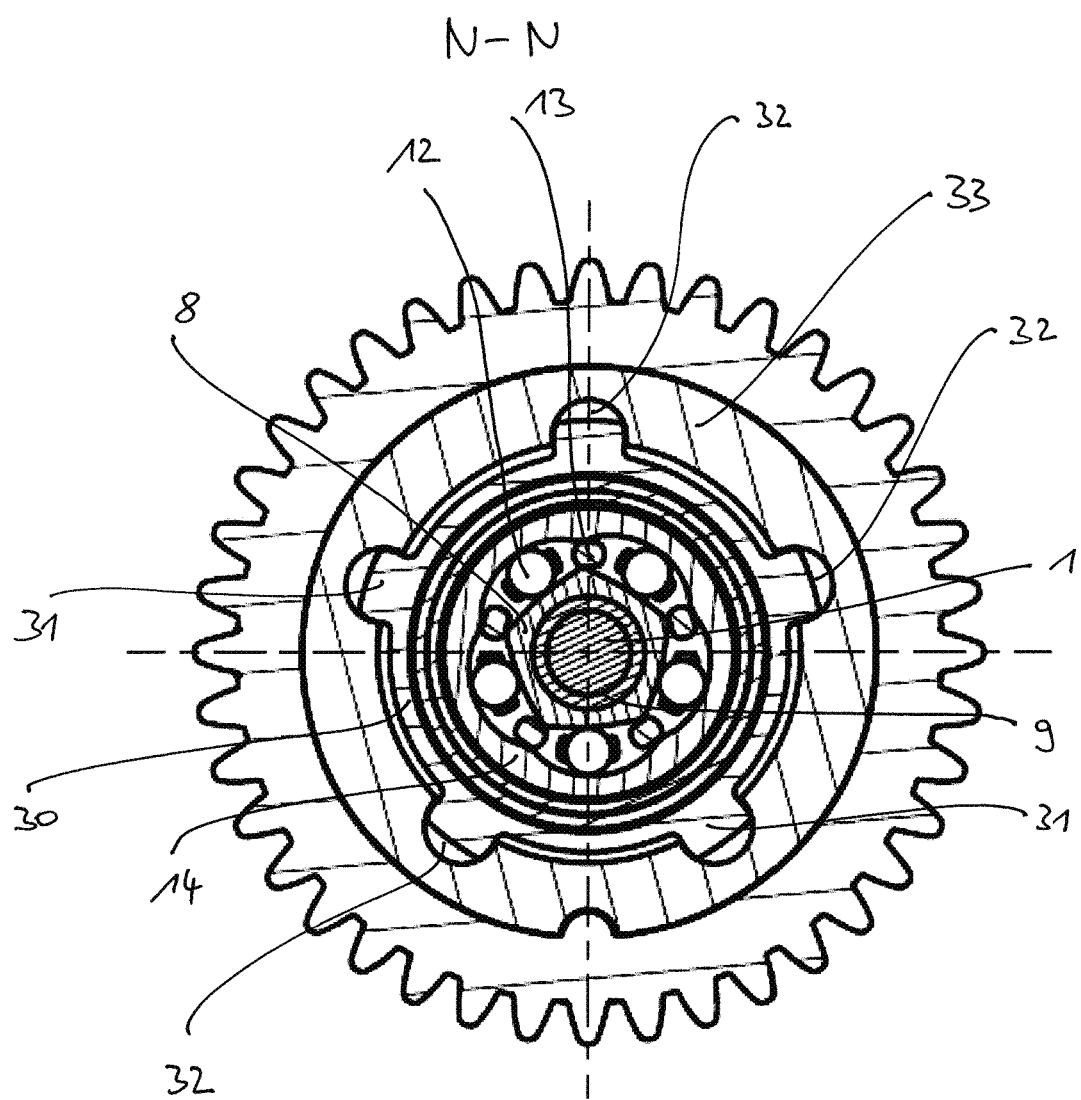
Figure 4C:
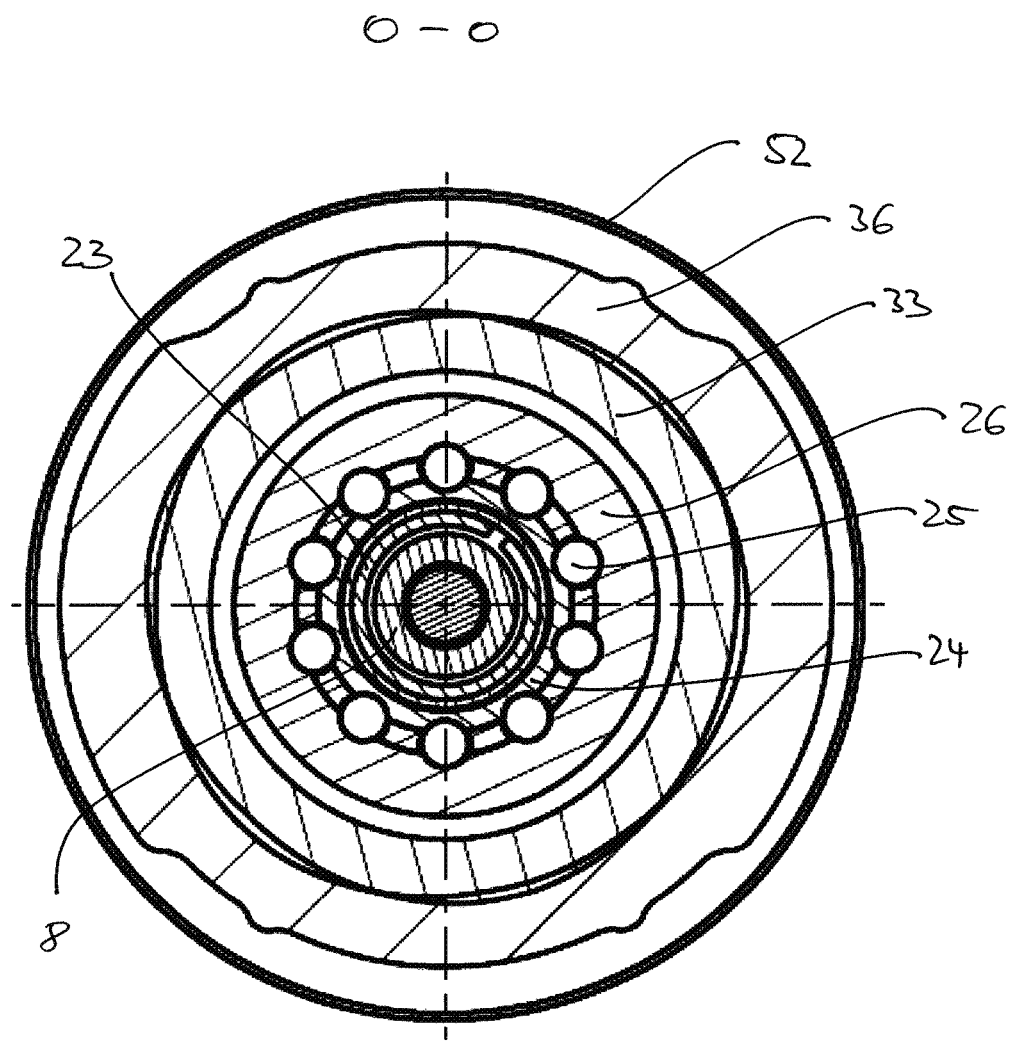
Figure 5:
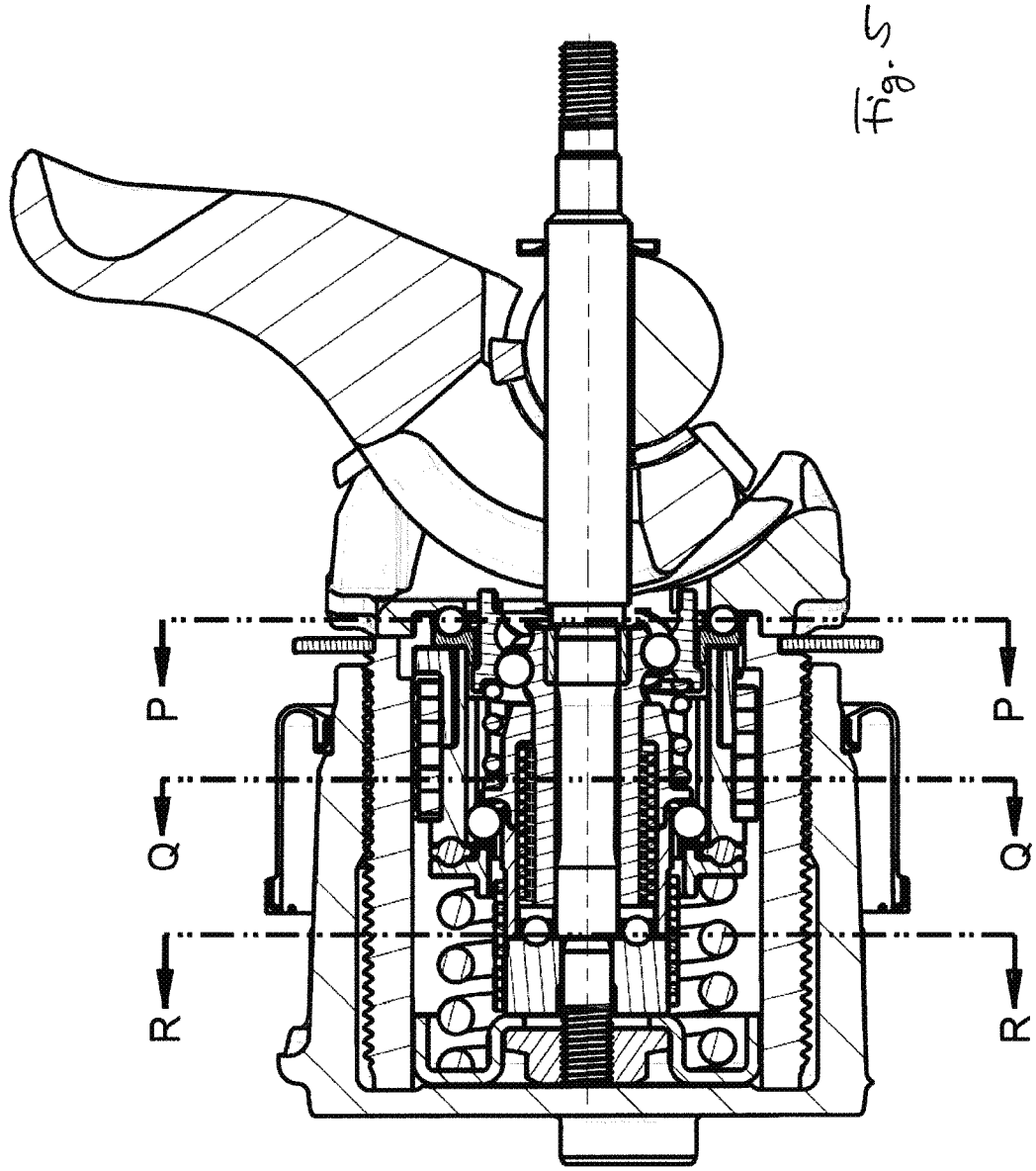
FIG. 5 is the longitudinal section from FIG. 1 with details of further sections.

The rear torque sleeve 30 has radial projections 31 which engage in corresponding recesses 32 (see FIG. 4b) of an adjusting spindle 33. The adjusting spindle 33 completely encloses the other components of the adjustment device B and has a thread 34 on the outside, which is in threaded engagement with an internal thread 35 of a pot-like thrust piece 36 of the thrust element C. At the front, the thrust piece 36 interacts with a brake pad holder (not shown here) to transfer the clamping force to the brake disc.

Figure 6A:
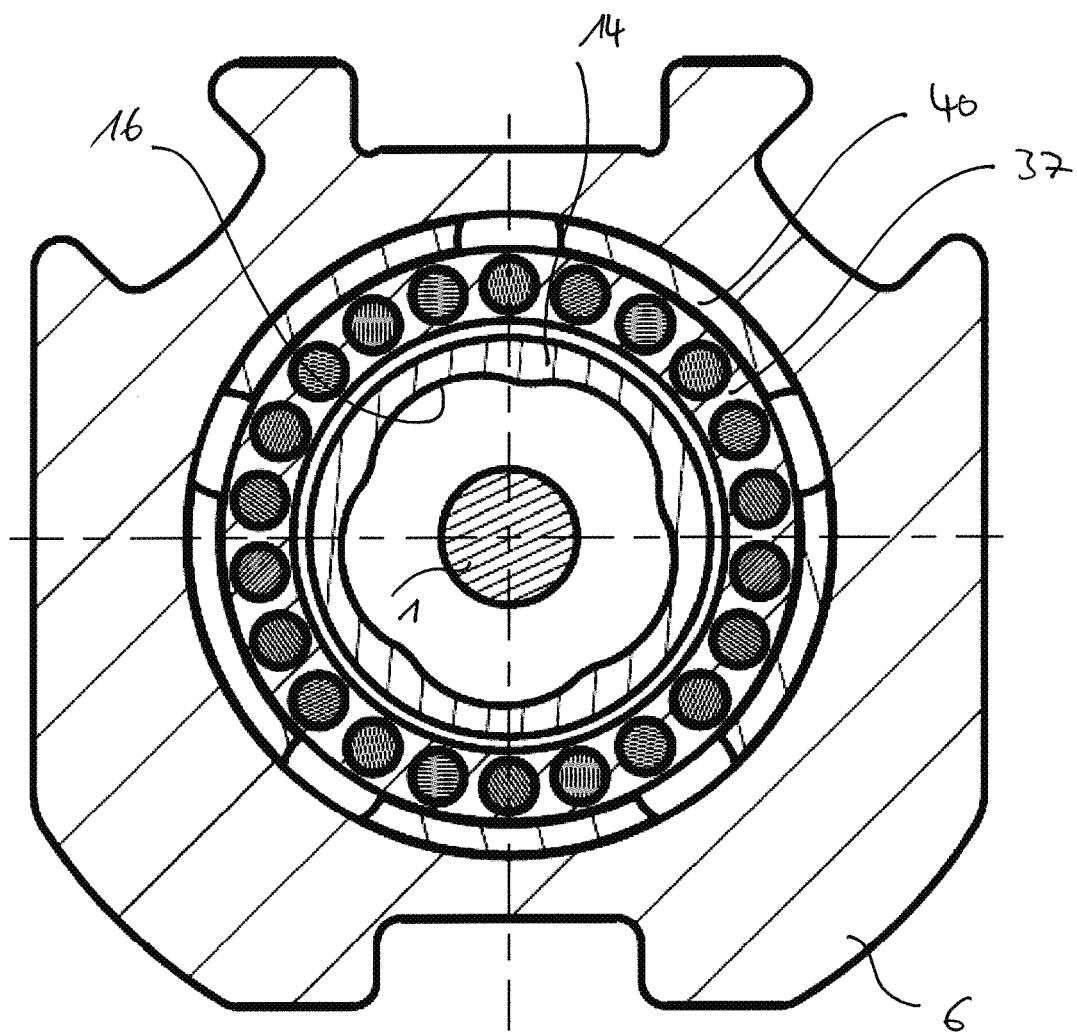
FIG. 6a is a cross-section along P-P from FIG. 5.
Figure 6B:
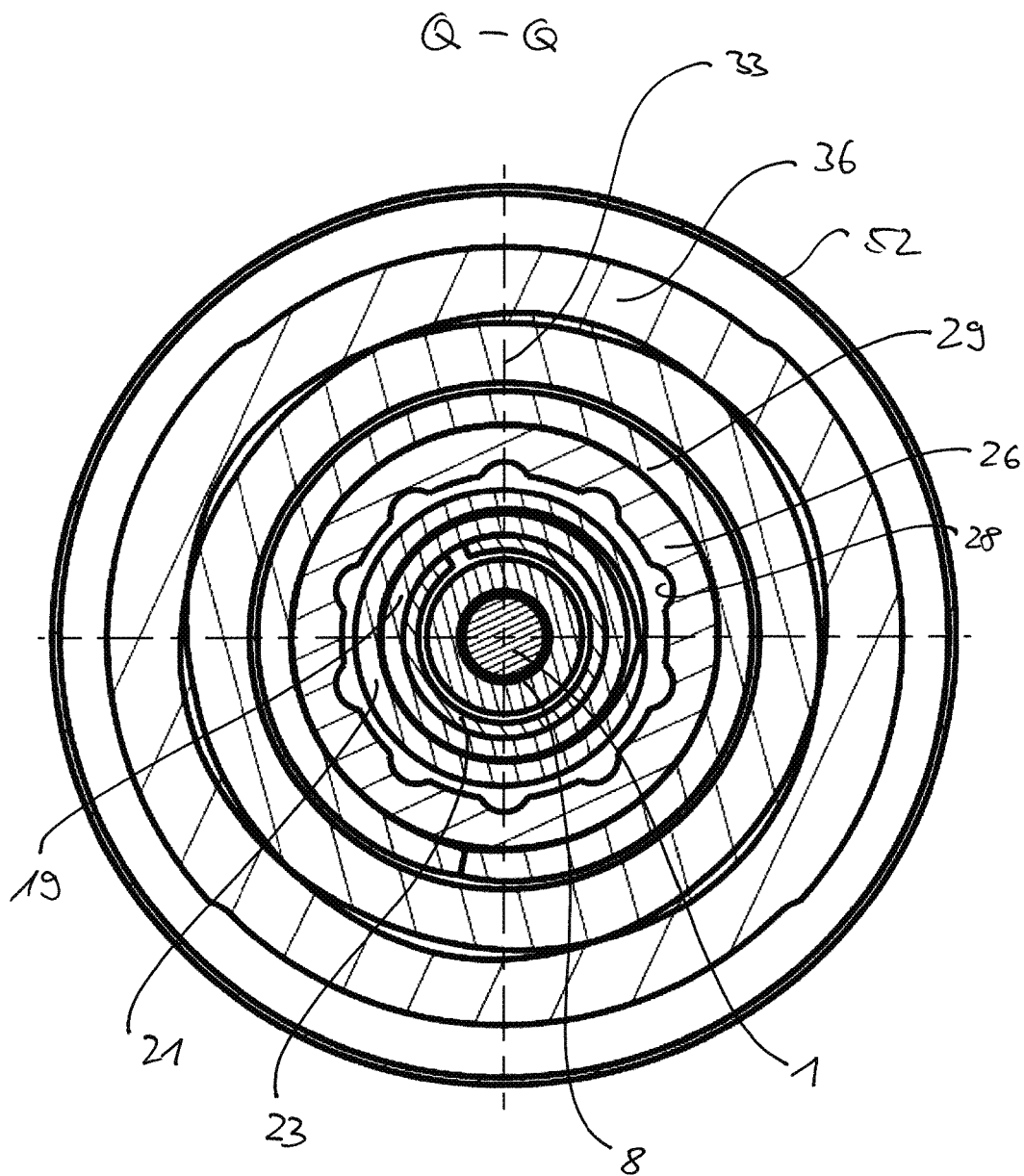
FIG. 6b is a cross-section along Q-Q from FIG. 5.
Figure 6C:
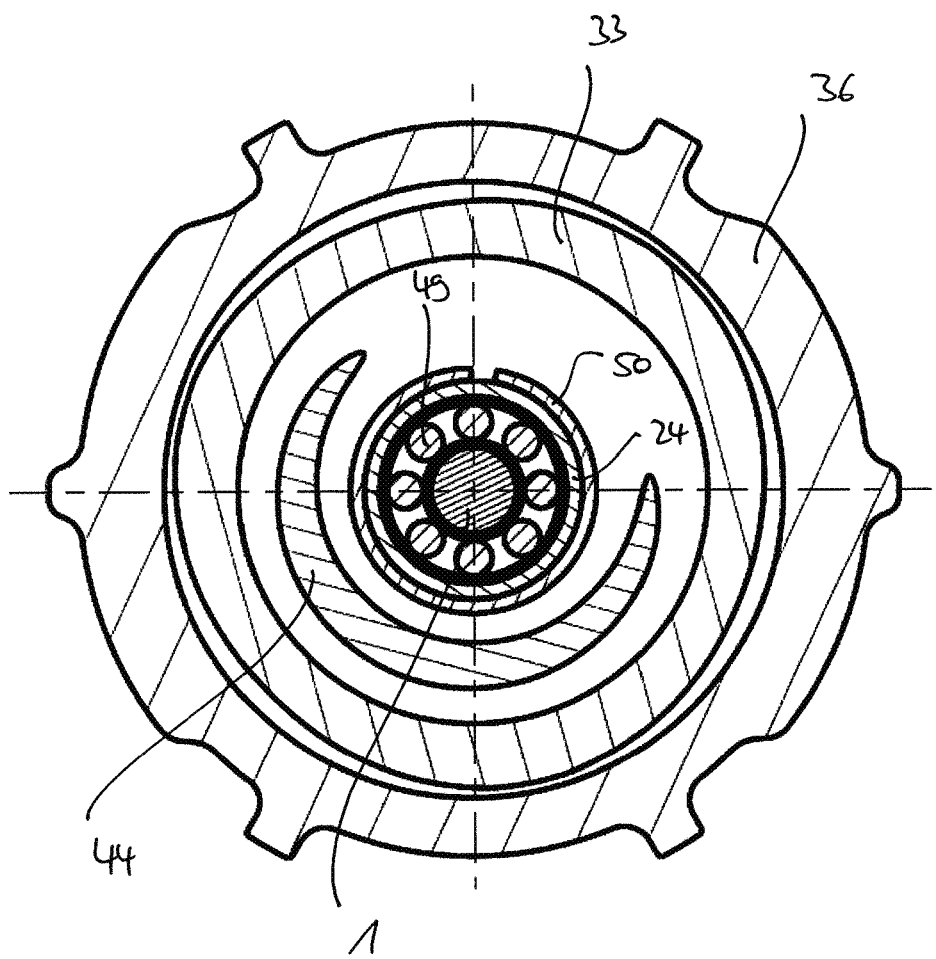
FIG. 6c is a cross-section along R-R from FIG. 5.

As the sectional view of FIG. 6a shows, the rear torque sleeve 30 is supported on the bearing seat body 6 by a low-friction radial bearing 37 with an intermediate ring 38 interposed. The bearing seat body 6 in turn is in direct contact with the adjusting spindle 33 via a bearing surface 39 (see FIG. 2b), whereby radially circumferential axial projections 40 (see FIG. 2a) of the adjusting spindle 33 engage in an annular recess 41 of the bearing seat body 6. This ensures that the main force flow of the clamping force from the bearing seat body 6 is effected directly into the adjusting spindle 33 and via the threaded engagement 34, 35 on the thrust piece 36, while due to the low-friction radial bearing 37 the rear torque sleeve 30 and thus the adjustment device B as a whole remains as far as possible decoupled from the clamping force in the axial direction.

On the side opposite the radial bearing 37, a plain slide bearing ring 42 is provided on the front torque sleeve 26, which is guided opposite a retaining ring 43.

A spring 44 of the resetting device D comes into contact with the retaining ring 43. The return spring 44, which is designed as a helical spring, in turn rests on an abutment shell 45, which is fastened to the end of rod 1 facing the brake disc by means of a fastening nut 46.

The abutment shell 45 is clamped between an abutment ring 47 and the fastening nut 46.

The hollow spindle 8 in turn is supported on the abutment ring 47 via a retaining ring 48 and an axial bearing 49 in a rotatable support which absorbs the axial forces acting on the hollow spindle 8.

By forming a third torque clutch M3, the abutment ring 47 is coupled via a third freewheeling spring 50 to the radial bearing hub 24, which encloses these components radially on the outside.

As can be seen from FIG. 1, the entire brake actuation mechanism is held on the brake disc side by the fastening nut 46 and on the disc side by a fastening ring 51 on the rod 1, facing away from the brake disc, in that the amplification mechanism A, the adjustment device B, the thrust element C and the resetting device D being functionally co-operatively arranged, the hollow adjusting spindle 33 receiving the remaining components of the adjustment device B and the resetting device D completely. The brake actuation mechanism can be mounted and fixed as a unit in a caliper housing by means of rod 1. For sealing against the housing of the brake caliper, a sealing sleeve 52 is provided between the thrust piece 36 and the inner wall of a housing of the brake caliper, which rolls axially with the translational movement of the thrust element C.

During brake actuation, when a translational movement of the bearing seat body 6 causes the hollow spindle 8 to rotate via the ball screw drive 7, the first freewheeling spring 23 of the first torque clutch M1 locks the coupling sleeve 19 with the radial bearing hub 24. The rotation is then transmitted accordingly to the front torque sleeve 26 via the radial bearing 25.

The correspondingly largely dimensioned second freewheeling spring 29 of the second torque clutch M2 slips during the actuation stroke as a function of the torque thus defined, thereby limiting the torque in relation to the rear torque sleeve 30, which is coupled to the adjusting spindle 33 in a rotationally fixed manner.

The rotation of the front torque sleeve 30 causes the return spring 44 to wind up over the plain bearing ring 42 and the retaining ring 43, i.e. to twist in itself and be compressed, as the frictional engagement between the return spring 44 and the retaining ring 43 is large enough to prevent slippage between the end of the return spring 44 and the retaining ring 43. The degree of winding or compression is limited by the front torque sleeve 30 and is determined by the friction in the plain bearing ring 42 between the retaining ring 43 and the front torque sleeve 26.

During brake release, i.e. when no more clamping force is transmitted, the spring 21 causes the nut 14 to follow the backward movement of the bearing seat body 6. This causes the hollow spindle 8 to be turned back into its original position.

In addition, the return spring 44 is re-wound or stretches, which causes the front torque sleeve 26 to rotate in the opposite direction via the retaining ring 43 and the plain bearing ring 42. In this direction of rotation, the second, correspondingly large freewheeling spring 29 couples the front torque sleeve 26 with the rear torque sleeve 30.

However, the extent of this rotation is limited by the fact that the third freewheeling spring 50 of the third torque clutch M3 brakes the rotation of the radial bearing hub 24, so to speak, i.e. limits the extent of the rotation of the radial bearing hub 24 according to the dimension to be adjusted. This limited revolution or revolutions is then transferred via the radial bearing 25 to the front torque sleeve 26 and thus to the rear torque sleeve 30, since in this direction of rotation the two torque sleeves 26 and 30 are coupled via the second freewheeling spring 29. The return spring 44 stops winding down or stretching as soon as the third freewheeling spring 50 locks. The third freewheeling spring 50 counteracts the coupling by the second freewheeling spring 29 with a quasi-defined resistance, which determines the dimension to be adjusted for each brake stroke. Finally, this rotation, which is subject to resistance from the third freewheeling spring 50, is transferred from the rear torque sleeve 30 via the torsion-resistant coupling to the adjusting spindle 33, which leads to a corresponding adjustment of the clearance due to the rotationally fixed guidance of the thrust piece 36 and the threaded engagement 34, 35, i.e. when the brake actuation mechanism is reset, the thrust piece 36 moves forward relative to the adjusting spindle 33 and towards the brake disc according to the rotation made by the adjusting spindle 33, while both elements actually move backwards relative to the caliper housing.

In quantitative terms, the clearance (A measure) is influenced by all tolerances or clearances distributed over the components of the brake actuation mechanism which, during an actuation stroke, i.e. when the lever 2 pushes the bearing seat body 6 forwards towards the brake disc, lie within the force flow within the scope of the adjustment. This includes a very small angular clearance between the bearing seat body 6 and the nut 14, usually corresponding to the tolerances intended for assembly, a clearance between the nut 14, the balls 12 and the hollow spindle 8, a rotational mobility of the first freewheeling spring 23 between the coupling sleeve 19, which is connected to the hollow spindle 8 in a rotationally fixed manner, and the radial bearing hub 24, which can then be driven via this first freewheeling spring 23, a clearance between this radial bearing hub 24, the balls of the radial bearing 25 and the front torque sleeve 26, a rotational mobility of the second freewheeling spring 29 between the front torque sleeve 26 and the rear torque sleeve 30, an angular clearance between the radial projections 31 of the rear torque sleeve 30 and the recesses 32 of the adjusting spindle 33 and a clearance in the thread between the adjusting spindle 33 and the thrust piece 36. By specifically dimensioning the aforementioned components and thus the individual clearances, tolerances and rotational mobilities, the required clearance (A measure) can be determined from a design point of view, which must then be set by the brake actuation mechanism according to the invention.

FIG. 12 shows an alternative embodiment of a hollow spindle 8.

This hollow spindle 8 has several grooves 53 in the area of its threaded section 10, which each extend only over part of the circumference of the hollow spindle 8 and overlap each other over a certain circumference. The ends of the grooves 53 are provided with stops 54 against which the balls 55, which are arranged in a single row ball cage 56, run. This limits the circumferential travel of the balls 55 and thus the degree of possible rotation of the hollow spindle 8. By selecting the degree of overlap and the circumferential extent of the grooves 53, the rotational behavior of the hollow spindle 8 can be determined in coordination with the other design specifications of the adjustment device B and thus its adjustment behavior.

REFERENCE NUMERAL LIST

A Amplification mechanism M1 First torque clutch
B Adjustment device M2 Second torque clutch
C Thrust element M3 Third torque clutch
D Resetting device
1 Rod
2 Lever
3 Roller
4 Needle bearing cages
5 Needle bearing cages
6 Bearing seat body
7 Ball screw drive
8 Hollow spindle
9 Plain bearing bush
10 Threaded section
11 Cylindrical section
12 Balls
13 Ball cage
14 Nut
15 Grooves
16 Grooves
17 Projections/pivots
18 Recesses
19 Coupling sleeve
20 Flange ring
21 Spring
22 Recess
23 First freewheeling spring
24 Radial bearing hub
25 Radial bearings/balls
26 Front torque sleeve
27 Longitudinal grooves
28 Longitudinal grooves
29 Second freewheeling spring
30 Rear torque sleeve
31 Radial projections
32 Recesses
33 Adjusting spindle
34 Thread
35 Female thread 36 Pot-like thrust piece
37 Low friction radial bearing
38 Intermediate ring
39 Bearing surface
40 Axial projections
41 Annular recess
42 Plain bearing ring
43 Retaining ring
44 Return spring
45 Abutment shell
46 Fastening nut
47 Abutment ring
48 Retaining ring
49 Axial bearing
50 Third freewheeling spring
51 Fastening ring
52 Sealing sleeve
53 Grooves
54 Stops
55 Balls
56 Ball cage

The invention claimed is:
1. A brake actuation mechanism for a disc brake having an amplification mechanism for introducing a clamping force for the braking operation;
a thrust element for transmitting the clamping force to a brake disc;
the amplification mechanism and the thrust element cooperating such that the thrust element performs a translational movement in the direction of the brake disc by a displacement movement of the amplification mechanism; and
an adjustment device for compensating wear of the lining;
wherein an input element of the adjustment device can be set in rotation by the translational movement;
wherein the input element of the adjustment device is formed as part of a ball screw drive.
2. The brake actuation mechanism according to claim 1, wherein the input element of the adjustment device interacts directly or indirectly with a torque clutch.
3. The brake actuation mechanism according to claim 1, wherein the input element of the adjustment device is designed as a spindle or as a nut of a ball screw drive.
4. The brake actuation mechanism according to claim 1, wherein the amplification mechanism, the thrust element and the adjustment device can be mounted together in the brake caliper by means of a rod in a functionally cooperating manner, the rod is mounted in a housing of a brake caliper of the disc brake so as to be immovable in the axial direction and not rotatable;
the input element of the adjustment device being in the form of a hollow spindle of a ball screw drive which is mounted rotatably on the rod.
5. The brake actuation mechanism according to claim 4, wherein a nut of the ball screw drive is axially applied with pressure by the amplification mechanism.
6. The brake actuating mechanism according to claim 5, wherein the amplification mechanism comprises a lever which is pivotably mounted in a bearing seat body and the nut of the ball screw drive is in a non-rotating connection with the bearing seat body.
7. The brake actuating mechanism according to claim 5, wherein the hollow spindle of the ball screw drive has a threaded section which is rotatably connected to the nut of the ball screw drive via balls, and a cylindrical portion.

8. The brake actuation mechanism according to claim 7, wherein the cylindrical section is supported at the end face by an abutment ring under a rotary support.
9. The brake actuating mechanism according to claim 7, wherein the cylindrical section is in a rotationally fixed connection with a coupling sleeve radially surrounding said cylindrical section.
10. The brake actuation mechanism according to claim 9, wherein a spring is arranged between the nut of the ball screw drive and the coupling sleeve and extends over a defined axial distance.
11. The brake actuation mechanism according to claim 9, wherein the coupling sleeve is coupled to a radial bearing hub via a first freewheeling spring to form a first torque clutch.
12. The brake actuation mechanism according to claim 11, wherein the coupling sleeve and the radial bearing hub enclose the first freewheeling spring radially on the inside and the first freewheeling spring maintains a radial distance from the cylindrical section of the hollow spindle.
13. The brake actuation mechanism according to claim 11, wherein the radial bearing hub is connected via a radial ball bearing to a front torque sleeve in a rotationally fixed but axially displaceable manner.
14. The brake actuation mechanism according to claim 13, wherein the front torque sleeve is coupled to a rear torque sleeve via a second freewheeling spring to form a second torque clutch.
15. The brake actuation mechanism according to claim 14, wherein the second freewheeling spring includes the front torque sleeve and the rear torque sleeve radially on the outside.
16. The brake actuation mechanism according to claim 14, wherein the rear torque sleeve is in a rotationally fixed connection with an adjusting spindle of the adjustment device radially surrounding the torque sleeved.
17. The brake actuation mechanism according to claim 16, wherein the adjusting spindle is in threaded engagement with a thrust piece of the thrust element, the thrust piece is mounted in a rotationally fixed manner.
18. The brake actuation mechanism according to claim 14, wherein the rear torque sleeve is rotatably mounted on the bearing seat body.
19. The brake actuation mechanism according to claim 11, wherein the radial bearing hub is coupled to the abutment ring via a third freewheeling spring to form a third torque clutch.
20. The brake actuation mechanism as claimed in claim 19, wherein the third freewheeling spring encloses the radial bearing hub and the abutment ring radially on the outside.
21. The brake actuation mechanism according to claim 13, wherein a return spring engages the front torque sleeve.
22. The brake actuation mechanism according to claim 21, wherein the front torque sleeve is rotatably mounted on a retaining ring via a plain bearing ring.
23. The brake actuation mechanism according to claim 22, wherein the return spring is arranged between the retaining ring and an abutment shell, the return spring extending over a defined axial distance.
24. The brake actuation mechanism according to claim 23, wherein the abutment shell is clamped between the abutment ring and a fastening nut attachable to the brake disc side end of the rod.
25. The brake actuation mechanism according to claim 19, wherein the first freewheeling spring of the first torque clutch and the second freewheeling spring of the second torque clutch as well as the first freewheeling spring of the first torque clutch and the third freewheeling spring of the third torque clutch overlap in sections in the axial direction.

26. The brake actuating mechanism according to claim 7, in which balls or ball cages are arranged in one or more rows between the nut and the threaded section of the ball screw drive.

27. The brake actuation mechanism according to claim 7, in which the number, pitch angles and/or circumferential extent of the grooves of the nut and/or the grooves of the threaded section are of different configuration.

28. The brake actuation mechanism according to claim 7, in which the grooves of the nut and/or the grooves of the threaded section have a varying pitch.

29. The brake actuation mechanism according to claim 7, in which the grooves of the nut and the grooves of the threaded section are configured such that a first adjustment at low rotational speeds of the hollow spindle and a further adjustment beyond that at higher rotational speeds of the hollow spindle is effected by the adjustment device.

30. A disc brake comprising a brake actuation mechanism according to claim 1.

31. The disc brake according to claim 30, wherein the brake actuation mechanism is mountable by a rod in a housing of a caliper of the disc brake as a self-supporting unit.

* * * * *